(12) United States Patent
Schonerwald

(10) Patent No.: US 8,596,329 B2
(45) Date of Patent: Dec. 3, 2013

(54) COVERING DEVICE, IN PARTICULAR FOR MACHINE TOOLS

(75) Inventor: Kurt Josef Schonerwald, Vilsheim (DE)

(73) Assignee: Hennig Holding GmbH, Kirchheim (DE)

( * ) Notice: Subject to any disclaimer, the term of this patent is extended or adjusted under 35 U.S.C. 154(b) by 0 days.

(21) Appl. No.: 13/570,394

(22) Filed: Aug. 9, 2012

(65) Prior Publication Data

US 2013/0036674 A1 Feb. 14, 2013

(30) Foreign Application Priority Data

Aug. 10, 2011 (DE) .......................... 10 2011 080 778

(51) Int. Cl.
*E05D 15/06* (2006.01)

(52) U.S. Cl.
USPC ........................................ 160/201; 160/196.1

(58) Field of Classification Search
USPC .............. 160/201, 196.1, 202, 118, 197, 352; 16/87.6 R, 87.8; 104/119; 384/15
See application file for complete search history.

(56) References Cited

U.S. PATENT DOCUMENTS

| 1,654,857 | A | * | 1/1928 | Brady | 160/196.1 |
| 2,100,882 | A | * | 11/1937 | Tamsitt | 160/196.1 |
| 4,966,219 | A | * | 10/1990 | Sonolet | 160/201 |
| 4,998,577 | A | * | 3/1991 | Kobayashi et al. | 160/202 |
| 5,042,556 | A | * | 8/1991 | Ruiter | 160/201 |
| 5,135,040 | A | * | 8/1992 | Ruiter | 160/201 |
| 5,549,149 | A | * | 8/1996 | Sills et al. | 160/201 |
| 6,082,499 | A | * | 7/2000 | O'Donnell | 187/324 |
| 6,684,932 | B2 | * | 2/2004 | Olofsson | 160/214 |

FOREIGN PATENT DOCUMENTS

DE     202005014233 U1   11/2005

* cited by examiner

*Primary Examiner* — David Purol
(74) *Attorney, Agent, or Firm* — Reising Ethington, P.C.

(57) ABSTRACT

A covering device such as a protective guard or screen, in particular for machine tools, has a link apron with a plurality of links connected to one another in an articulated manner and sliding elements arranged on the links at the end. The link apron is guided by means of the sliding elements on at least one guide element, the at least one guide element having at least one linear guide portion and at least one curved guide portion with a radius R of curvature. For lateral support of the link apron in the region of the at least one curved guide portion, at least one support unit is provided, which has a plurality of support rolls, which are rotatably mounted and rest against the link apron. The support rolls in each case have a roll radius r, which is smaller than the radius R of curvature. The robustness and the service life of the covering device is increased by the at least one support unit.

16 Claims, 5 Drawing Sheets

COVERING DEVICE, IN PARTICULAR FOR MACHINE TOOLS

CROSS-REFERENCE TO RELATED APPLICATIONS

This application claims the priority of German Patent Application, Serial No. 10 2011 080 778.0, filed Aug. 10, 2011, pursuant to 35 U.S.C. 119(a)-(d), the content of which is incorporated herein by reference in its entirety as if fully set forth herein.

FIELD OF THE INVENTION

The invention relates to a covering device such as a protective guard or screen, in particular for machine tools, comprising a link apron with a plurality of links connected to one another in an articulated manner and sliding elements arranged at the end on the links, and comprising at least one guide element to guide the link apron by means of the sliding elements with at least one linear guide portion.

BACKGROUND OF THE INVENTION

A covering device or protective screen for machine tools is known from DE 20 2005 014 233 U1 and has a link apron with a plurality of links connected to one another in an articulated manner and sliding elements arranged on the links at the end. The sliding elements, together with the links, form a guide gap, into which a linearly running guide rail extends. The link apron can be displaced along the guide rail, so a working space of the machine tool can be covered in order to thus prevent dirt or metal chips leaving or entering.

SUMMARY OF THE INVENTION

The invention is based on an object of developing a covering device of the generic type in such a way that the link apron can be deflected in a simple and robust manner.

This object is achieved by a covering device, in which the at least one guide element has at least one curved guide portion with a radius R of curvature, and in which at least one support unit for lateral support of the link apron is arranged in the region of the at least one curved guide portion, wherein the at least one support unit has a plurality of support rolls, which are rotatably mounted and rest against the link apron, and the support rolls in each case have a roll radius r, which is smaller than the radius R of curvature. The deflection takes place by means of at least one curved guide portion of the at least one guide element. It was recognized according to the invention that during a pulling and/or pushing displacement movement of the link apron, forces leading to increased stressing of the links and/or sliding elements act on the links and/or the sliding elements as a result of the deflection in a lateral direction. As a result, the links and/or sliding elements have a reduced service life. In order to avoid this, the covering device according to the invention has at least one support unit for the lateral support of the link apron in the region of the at least one curved guide portion. The at least one support unit comprises a plurality of rotatably mounted support rolls, which rest against the link apron and thus absorb the forces acting as a result of the deflection and relieve the load on the links and/or the sliding elements.

The support rolls are arranged in such a way that their associated rotational axes run substantially parallel to the longitudinal direction of the links. The support rolls thus rest with a peripheral face partially against the links. Since the roll radius r of the support rolls is smaller than the radius R of curvature of the at least one guide element, the link apron is supported at small intervals along the at least one curved guide portion, so a relatively uniform support and a uniform load relief connected therewith of the links and/or sliding elements is achieved. On the other hand, a plurality of support rolls with a relatively small roll radius ensure a simple and economical structure of the covering device as this is more economical despite the larger number of support rolls and requires a smaller installation space than when using less support rolls with a larger roll radius. The covering device preferably has support units on an inside and on an outside of the link apron, support units being arranged on a lower first end and on an upper second end of the link apron. The support units preferably have, in each case, at least three, in particular at least four, and, in particular, at least five, support rolls. This produces an optimal support and load relief of the links and/or sliding elements.

A covering device, in which there applies to the ratio of the roll radius r to the radius R of curvature $r/R \le 1/4$, in particular $r/R \le 1/6$ and in particular $r/R \le 1/8$, and in which the links have a width b and there applies to the ratio of the roll radius r to the width b $1/10 \le r/b \le 1$, in particular $2/10 \le r/b \le 9/10$ and in particular $3/10 \le r/b \le 8/10$, ensures a uniform load relief of the links and/or sliding elements in the region of the at least one curved guide portion. This achieves a simple structure and a high degree of robustness of the covering device. The diameter, in other words, twice the roll radius r of the support rolls, is preferably approximately equal to the width b of the links.

A covering device, in which the support rolls are rotatably mounted on at least one plate-shaped and curved carrier, and in which the support rolls are rotatably mounted on both sides on two curved carriers, ensures a simple and robust mounting of the support rolls.

A covering device, in which a first support unit is arranged on an inside of the link apron and the associated support rolls rest against internal walls of the links, and a second support unit is arranged on an outside of the link apron and the associated support rolls rest against external walls of the links, ensures that the links and/or the sliding elements are relieved of the load both during a pushing and a pulling displacement movement.

A covering device, in which the first support unit is arranged mutually offset relative to the second support unit in the longitudinal direction of the links, ensures an optimal support and load relief, when there is a different configuration of the links, on the inside and outside thereof.

A covering device, in which the at least one guide element is configured as a guide rail, and in which the links in each case have an internal wall and an external wall that is shortened in the longitudinal direction of the links, and in which the links, in each case delimit, with the internal wall and with the associated sliding element, a guide gap, in which the guide rail runs, ensures a simple and robust guidance of the link apron.

A covering device, in which the sliding elements are held in a recess of the links, the recess being formed as a cavity, in particular, ensures a simple and robust fastening of the sliding elements on the links and therefore a simple and robust configuration of the guidance.

A covering device, in which at least one support unit is arranged on a lower first end and at least one further support unit is arranged on an upper second end of the link apron, provides a support of the link apron at the two ends. As a result, the links and/or the sliding elements are relieved of the load at the two ends of the link apron, so the latter have a high degree of robustness and a long service life. The support units arranged at the two ends may be arranged on an inside and/or an outside of the link apron.

Further features, advantages and details of the invention emerge from the following description of an embodiment

DESCRIPTION OF THE PREFERRED EMBODIMENT

Figure 1:
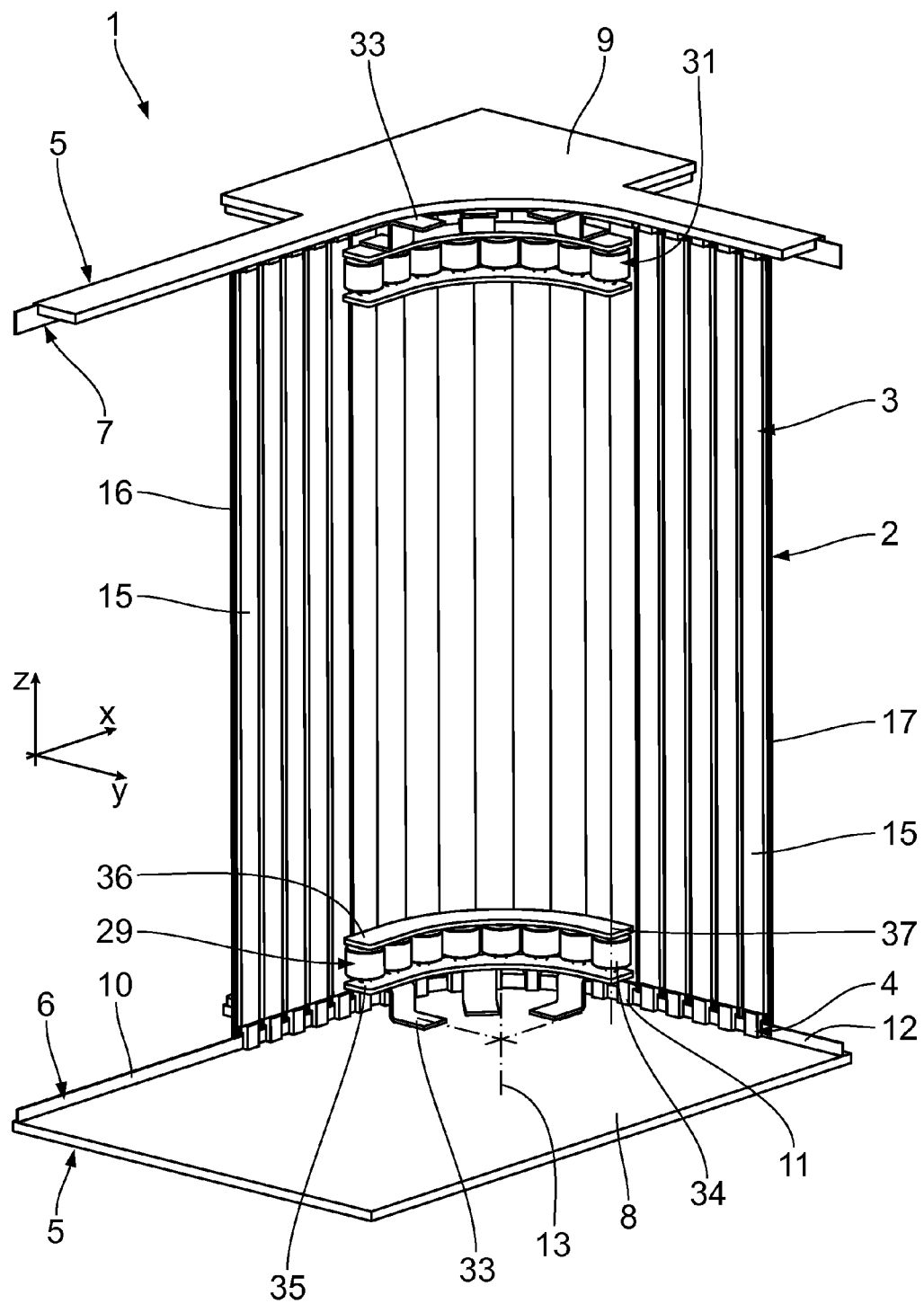
FIG. 1 shows a first perspective view of a covering device for a machine tool.
Figure 2:
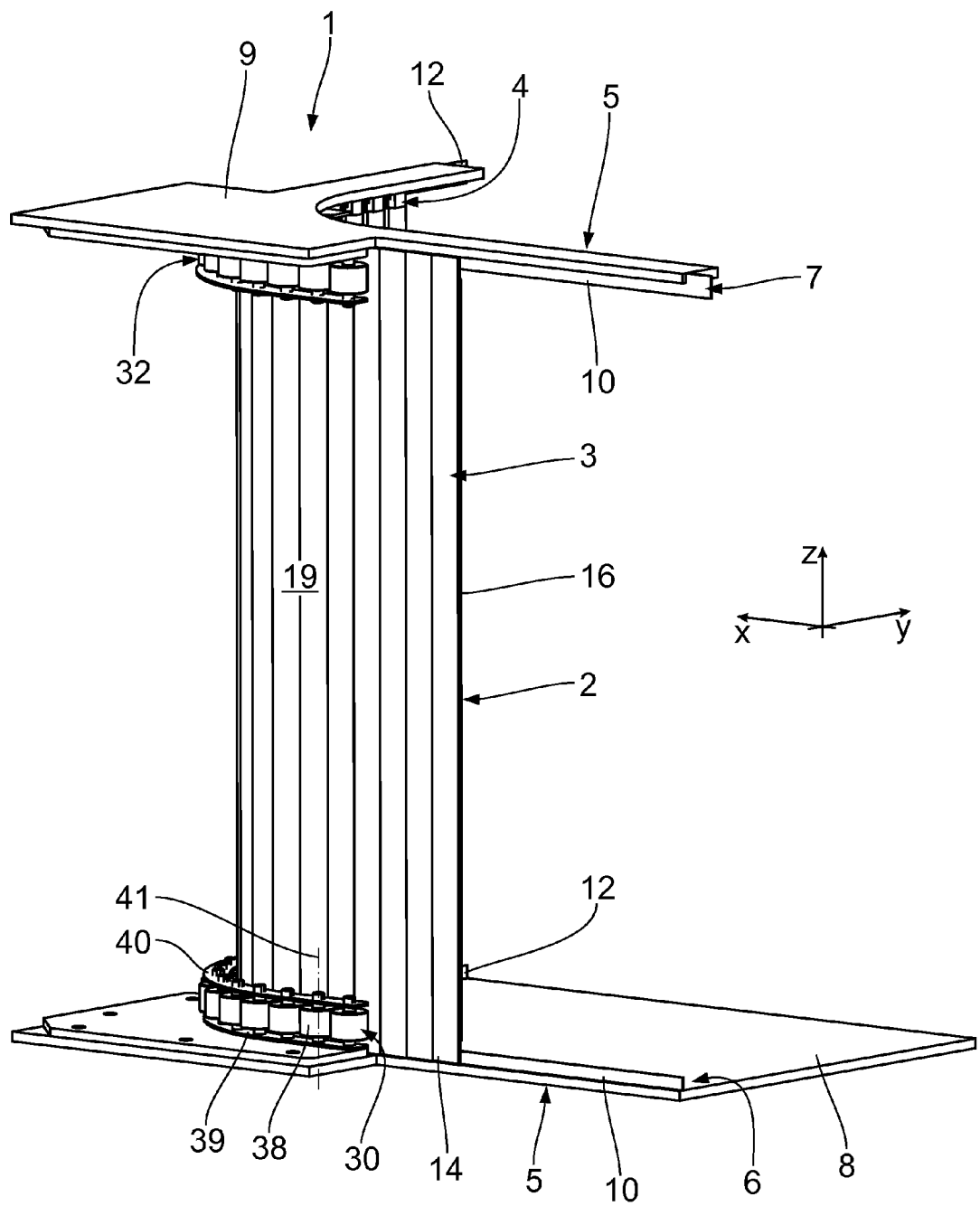
FIG. 2 shows a second perspective view of the covering device in FIG. 1.
Figure 3:
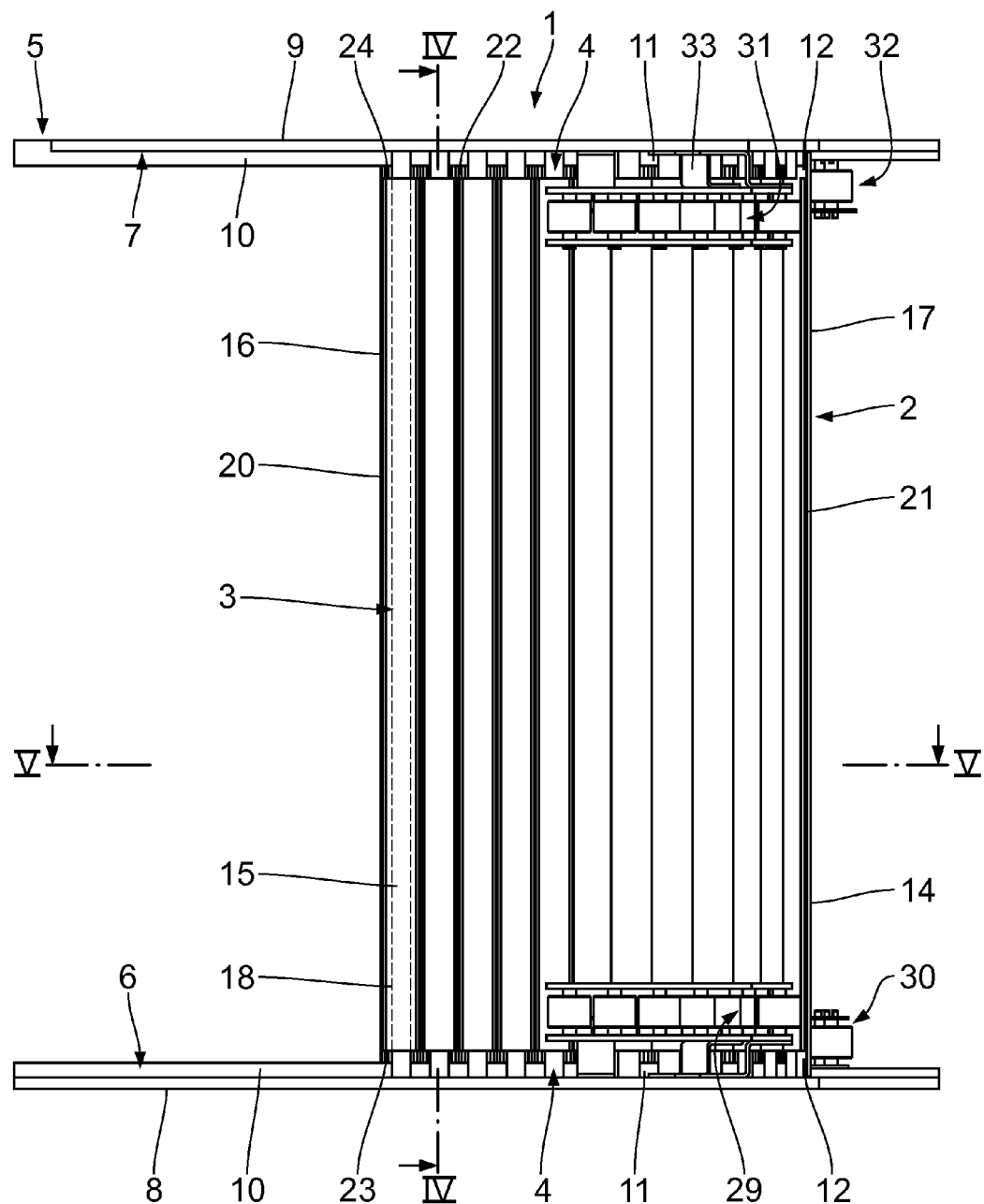
FIG. 3 shows a lateral view of the covering device in FIG. 1.
Figure 4:
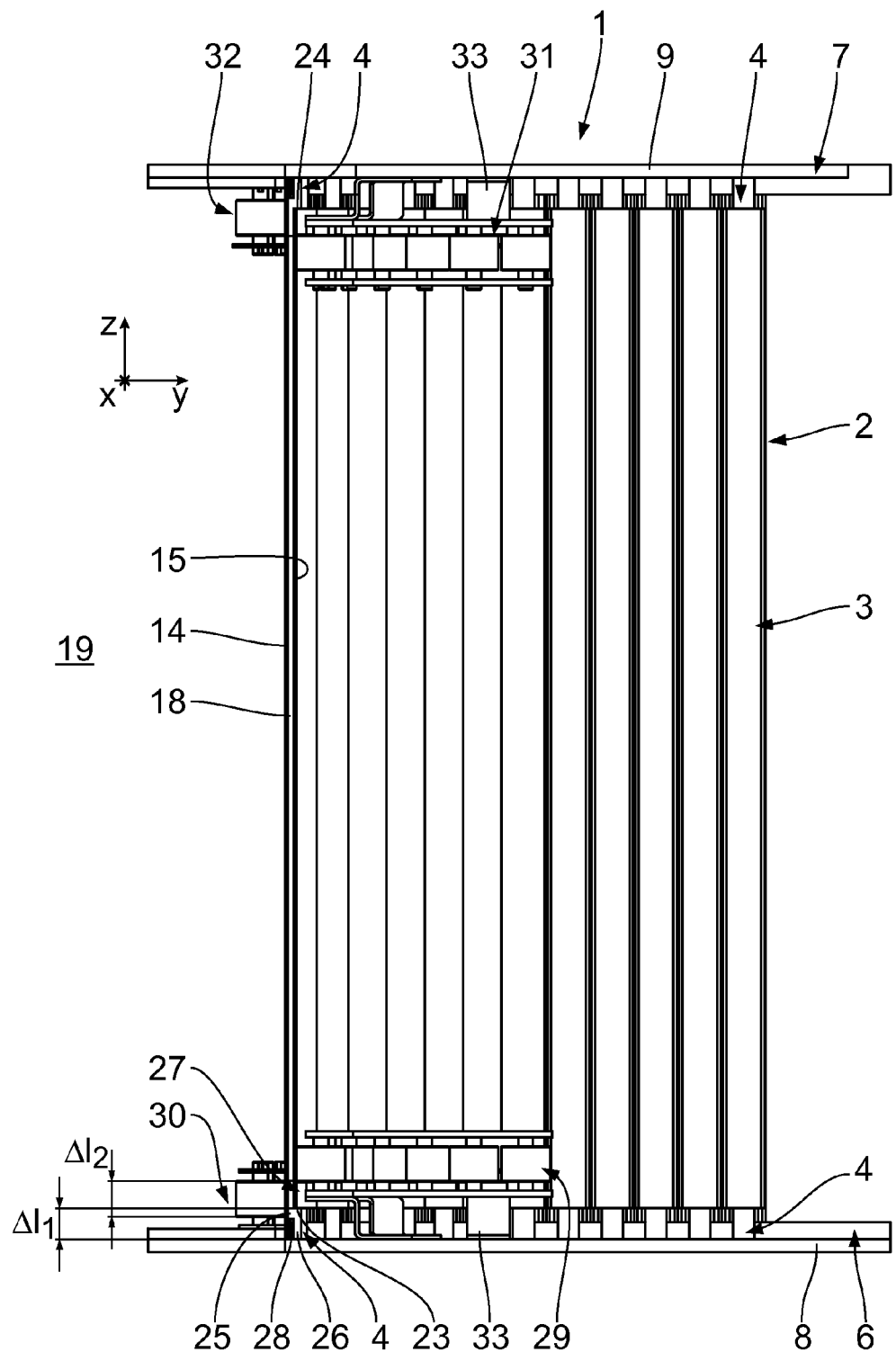
FIG. 4 shows a longitudinal section through the covering device in FIG. 3 along the section line IV-IV.
Figure 5:
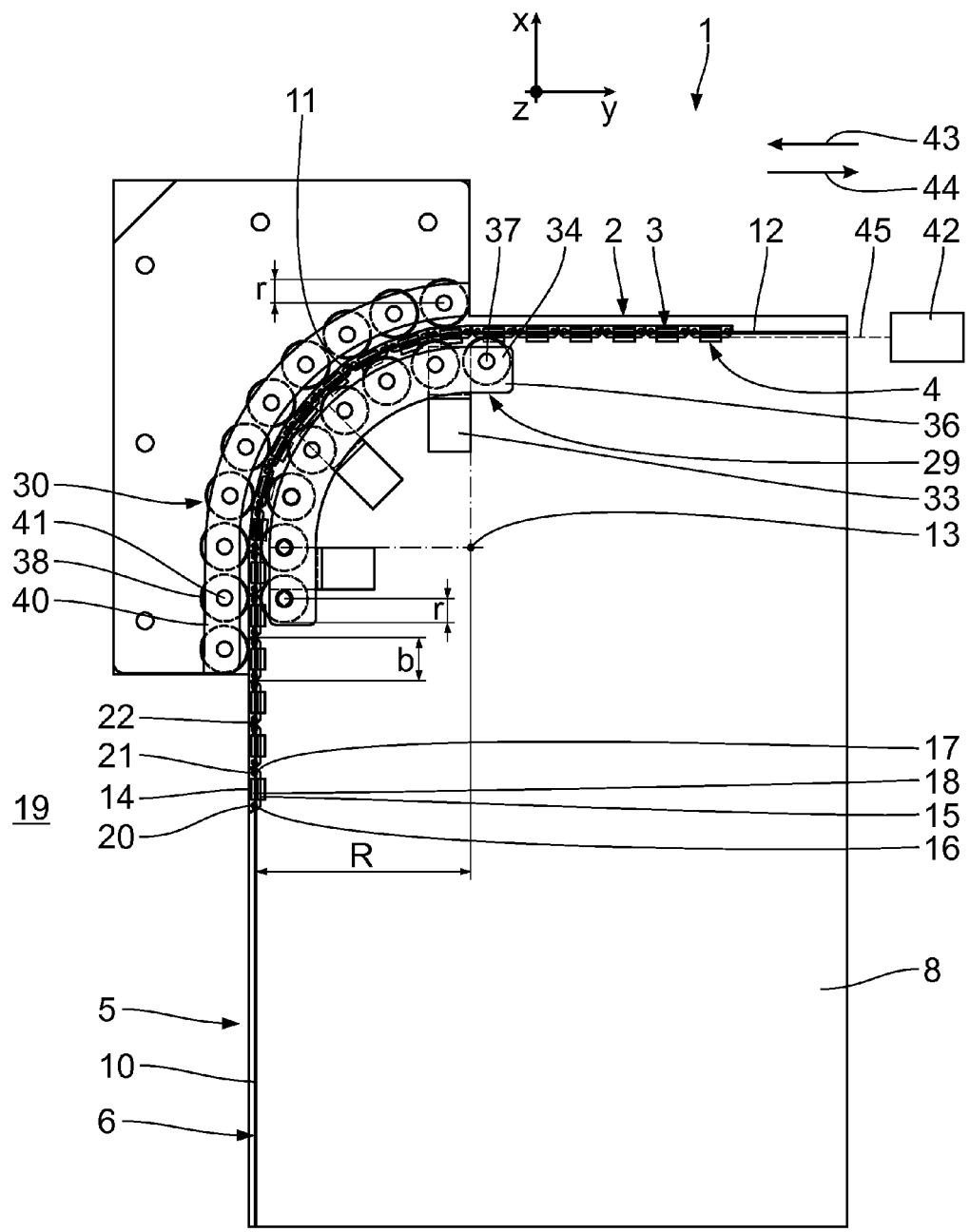
FIG. 5 shows a cross section through the covering device in FIG. 3 along the section line V-V.

A covering device 1 such as a protective guard or screen for a machine tool has a link apron 2, which is formed from a plurality of links 3 connected to one another in an articulated manner. Sliding elements 4, which are used to displace and guide the link apron 2, are arranged at the end on the links 3.

The link apron 2 is mounted and guided on a guide 5, which has a lower first guide element 6 and an associated upper second guide element 7. The guide elements 6, 7 are configured as guide rails and are thus designated below. The guide rails 6, 7 are fastened to associated base bodies 8, 9, which are in turn fastened to the machine tool, not shown any further. The guide rails 6, 7 in each case have a first guide portion 10 running linearly in a horizontal x-direction, a curved second guide portion 11 adjacent thereto and a third guide portion 12 running linearly in a horizontal y-direction adjacent thereto. The second guide portions 11 define a deflection axis 13 and a radius R of curvature.

The links 3 have, in each case, a flat internal wall 14 and a flat external wall 15, which walls, together with side walls 16, 17, delimit a recess 18 in the form of a cavity. The internal walls 14 face a working space 19 of the machine tool. For articulated connection of the links 3, the latter in each case have grooves 20, 21 running in a vertical z-direction on the side walls 16, 17, in which grooves flexible connecting elements 22 are arranged. The z direction defines the longitudinal direction of the links 3. The x-, y- and z-directions run perpendicular to one another and form a Cartesian coordinate system.

The external walls 15 of the links 3 are shortened in relation to the associated internal walls 14 by a length $\Delta l_1$ in the longitudinal direction of the links 3. The respective internal wall 14 therefore, together with the associated side walls 16, 17, forms a lower first end wall 23 and an upper second end wall 24. The cavities 18 extend in each case in the links 3 from the first end wall 23 to the second end wall 24.

The sliding elements 4 in each case have a sliding portion 25 running in the x-y-plane as well as a guide portion 26 running perpendicular thereto and a fastening portion 27 running perpendicular thereto. The guide portion 26 runs parallel and offset relative to the associated fastening portion 27. The sliding elements 4 are in each case introduced with their fastening portions 27 into the cavity 18 in such a way that the sliding portion 25 rests against the respective associated end wall 23, 24 and the guide portion 26, together with the associated internal wall 14, forms a guide gap 28, in which the guide rail 6, 7 runs. The sliding elements 4 are non-positively held in the associated cavity 18, in each case.

The covering device 1 comprises for the lateral support of the link apron 2 in the region of the curved portions 11, four support units 29, 30, 31, 32. Two support units 29, 30 are arranged on a lower first end of the link apron 2 and two further support units 31, 32 are arranged on an upper second end of the link apron 2. Two outer support units 29, 31, at the two ends of the link apron 2, rest against the external walls 15 of the links 3, while two inner support units 30, 32 rest against the internal walls 14 of the links 3 at the two ends of the link apron 2. The support units 29 to 32 are fastened to the associated base bodies 8, 9, the inner support units 30, 32 being fastened directly to the base bodies 8, 9, whereas the outer support units 29, 31 are fastened by means of twice-bent holders 33, spaced apart in the z-direction from the base bodies 8, 9, to said base bodies. The respective outer support unit 29, 31 is therefore arranged offset with respect to the associated inner support unit 30, 32 in the z-direction by a spacing $\Delta l_2$, where $\Delta l_2 \approx \Delta l_1$.

The outer support units 29, 31 in each case have at least three, in particular at least four, in particular at least five, outer support rolls 34, which are rotatably mounted between two associated plate-shaped and curved carriers 35, 36. The outer support rolls 34 in each case have an associated rotational axis 37, which runs parallel to the z-direction. The rotational axes 37 or the outer support rolls 34 are arranged along the curved guide portion 11 on an outer side of the link apron 2 in such a way that the outer support rolls 34 rest against the outer walls 15 of the links 3.

Accordingly, the inner support units 30, 32 in each case have at least four, in particular at least five, and in particular at least six, inner support rolls 38, which are in each case rotatably mounted on two associated plate-shaped and curved carriers 39, 40. The inner support rolls 38 have associated rotational axes 41, which run parallel to the z-direction. The rotational axes 41 of the inner support rolls 38 are arranged on the inside of the link apron 2 in such a way that the inner support rolls 38, along the curved guide portion 11, rest against the internal walls 14 of the link apron 2.

The support rolls 34, 38 in each case have a roll radius r, which is smaller, or substantially smaller, than the radius R of curvature. There applies to the ratio of the roll radius r to the radius R of curvature: $r/R \leq 1/4$, in particular $r/R \leq 1/6$ and in particular, $r/R \leq 1/8$. The links 3, transverse to their longitudinal direction, have a width b, wherein there applies to the ratio of the roll radius r to the width b: $1/10 \leq r/b \leq 1$, in particular $2/10 \leq r/b \leq 9/10$ and in particular, $3/10 \leq r/b \leq 8/10$.

The link apron 2 is pushed by means of an actuating drive 42 in a first direction 43 and pulled in a second direction 44. For this purpose, the actuating drive 42 acts on an actuating side 45 of the link apron 2.

The link apron 2 is pushed in the conventional manner by means of the actuating drive 42 along the guide rails 6, 7 in the first direction 43 and pulled in the second direction 44. The links 3 are guided here on the guide rails 6, 7 through the respective guide gap 28, which is formed by the respective internal wall 14 and the associated sliding element 4.

Without the support units 29 to 32, upon a movement of the link apron 2 in the direction 43, the sliding elements 4 would be heavily loaded in the region of the curved guide portions 11, as owing to the pushing movement of the link apron 2, these deflect the links 3 about the deflection axis 13 and thus rest with comparatively high forces against the respective guide rail 6, 7. Accordingly, upon a movement of the link apron 2 in the second direction 44, the internal walls 14 would be heavily loaded in the region of the curved guide portions 11, as owing to the pulling movement, these deflect the links 3 about the deflection axis 13 and thus rest with comparatively high forces against the respective guide rail 6, 7.

In order to avoid loadings of this type of the links 3 and/or of the sliding elements 4, the support rolls 34, 38 rest against the link apron 2. During a pushing movement in the direction 43, the inner support rolls 38 of the support units 30, 32 relieve the load on the sliding elements 4. In a corresponding manner, upon a pulling movement in the direction 44, the outer support rolls 34 of the support units 29, 31 relieve the load on the internal walls 14. The robustness of the covering device 1 or the link apron 2 is thereby increased, so the covering device 1 has a longer service life. The support rolls 34, 38 can be arranged narrowly spaced apart from one another due to the comparatively small roll radius r, so load relief points, at which the support rolls 34, 38 rest against the link apron 2, are arranged along the curved guide portions 11 at small intervals. As a result, the links 3 and/or the sliding elements 4 are relieved of the load relatively uniformly along the curved guide portions 11. Moreover, the support rolls 34, 38 are simply and economically constructed because of the small roll radius r. The support rolls 34, 38 additionally only have a small space requirement along the curved guide portions 11.

What is claimed is:

1. A covering device comprising:
   a link apron with;
      a plurality of links connected to one another in an articulated manner; and, sliding elements arranged at the end on the links;
   at least one guide element to guide the link apron by means of the sliding elements with at least one linear guide portion, wherein:
      the at least one guide element has at least one curved guide portion with a radius R of curvature; and,
      at least one support unit for lateral support of the link apron is arranged in the region of the at least one curved guide portion, wherein:
         the at least one support unit has a plurality of support rolls, which are rotatably mounted and rest against the link apron; and,
         the support rolls in each case have a roll radius r, which is smaller than the radius R of curvature.

2. A covering device according to claim 1 wherein the covering device is a protective guard or screen for machine tools.

3. A covering device according to claim 1, wherein the ratio of the roll radius r to the radius R of curvature is equal to $r/R \leq 1/4$.

4. A covering device according to claim 1, wherein the ratio of the roll radius r to the radius R of curvature is equal to $r/R \leq 1/6$.

5. A covering device according to claim 1, wherein the ratio of the roll radius r to the radius R of curvature is equal to $r/R \leq 1/8$.

6. A covering device according to claim 1, wherein the links have a width b and the ratio of the roll radius r to the width b is equal to $1/10 \leq r/b \leq 1$.

7. A covering device according to claim 1, wherein the links have a width b and the ratio of the roll radius r to the width b is equal to $2/10 \leq r/b \leq 9/10$.

8. A covering device according to claim 1, wherein the links have a width b and the ratio of the roll radius r to the width b is equal to $3/10 \leq r/b \leq 8/10$.

9. A covering device according to claim 1, wherein the support rolls are rotatably mounted on at least one plate-shaped and curved carrier.

10. A covering device according to claim 1, wherein the support rolls are rotatably mounted on both sides on two curved carriers.

11. A covering device according to claim 1, wherein:
   a first support unit is arranged on an inside of the link apron and the associated support rolls rest against internal walls of the links; and
   a second support unit is arranged on an outside of the link apron and the associated support rolls rest against external walls of the links.

12. A covering device according to claim 11, wherein the first support unit is arranged mutually offset relative to the second support unit in the longitudinal direction of the links.

13. A covering device according to claim 1, wherein:
   the at least one guide element is configured as a guide rail;
   the links in each case have an internal wall and an external wall that is shortened in the longitudinal direction of the links; and,
   the links, in each case delimit, with the internal wall and with the associated sliding element, a guide gap, in which the guide rail runs.

14. A covering device according to claim 1, wherein the sliding elements are held in a recess of the links.

15. A covering device according to claim 14, wherein the recess is formed as a cavity.

16. A covering device according to claim 1, wherein at least one support unit is arranged on a lower first end and at least one further support unit is arranged on an upper second end of the link apron.

* * * * *